April 28, 1931.  R. D. HOOD  1,802,945
PLASTERING MACHINE
Filed May 13, 1929   3 Sheets-Sheet 1

INVENTOR.
Robert D. Hood.
BY
Townsend, Loftus & Abbett
ATTORNEYS.

April 28, 1931. R. D. HOOD 1,802,945
PLASTERING MACHINE
Filed May 13, 1929 3 Sheets-Sheet 3

INVENTOR.
Robert D. Hood.
BY Townsend Loftus & Hackett
ATTORNEYS.

Patented Apr. 28, 1931

1,802,945

UNITED STATES PATENT OFFICE

ROBERT D. HOOD, OF SAUSALITO, CALIFORNIA

PLASTERING MACHINE

Application filed May 13, 1929. Serial No. 362,777.

This invention relates to a plastering machine whereby plaster or mortar is adapted to be conveyed from a hopper through a flexible tube or hose to a trowel, such as shown in my co-pending application entitled "Mortar spreader" filed April 29th, 1929, Serial Number 358,817, said trowel serving the function of applying and spreading the mortar over a surface to be plastered.

The object of the present invention is to generally improve and simplify the construction and operation of machines of the character described; to provide a portable machine which may be readily moved from place to place as the plastering work proceeds, thereby permitting the use of a comparatively short hose line at all times; to provide a feed hopper for the reception of the mortar; to provide means for mixing the mortar and for delivering it to the feed hopper; to provide a double acting plunger pump for delivering the mortar under pressure to the hose line and the trowel; to provide means whereby the pump may be intermittently operated as required; and further to provide means whereby the mortar is delivered by gravity feed from the feed hopper to the pumps.

Figure 1:
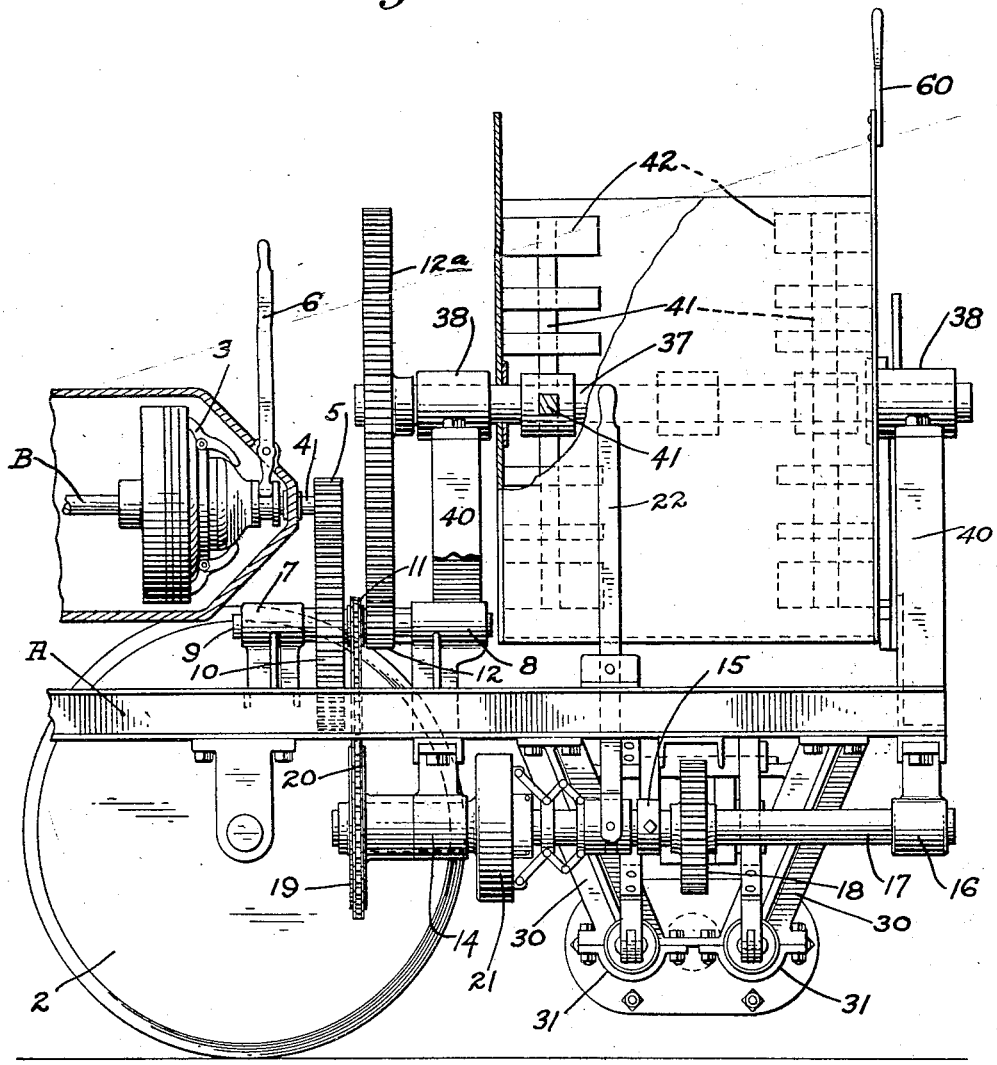
Figure 2:
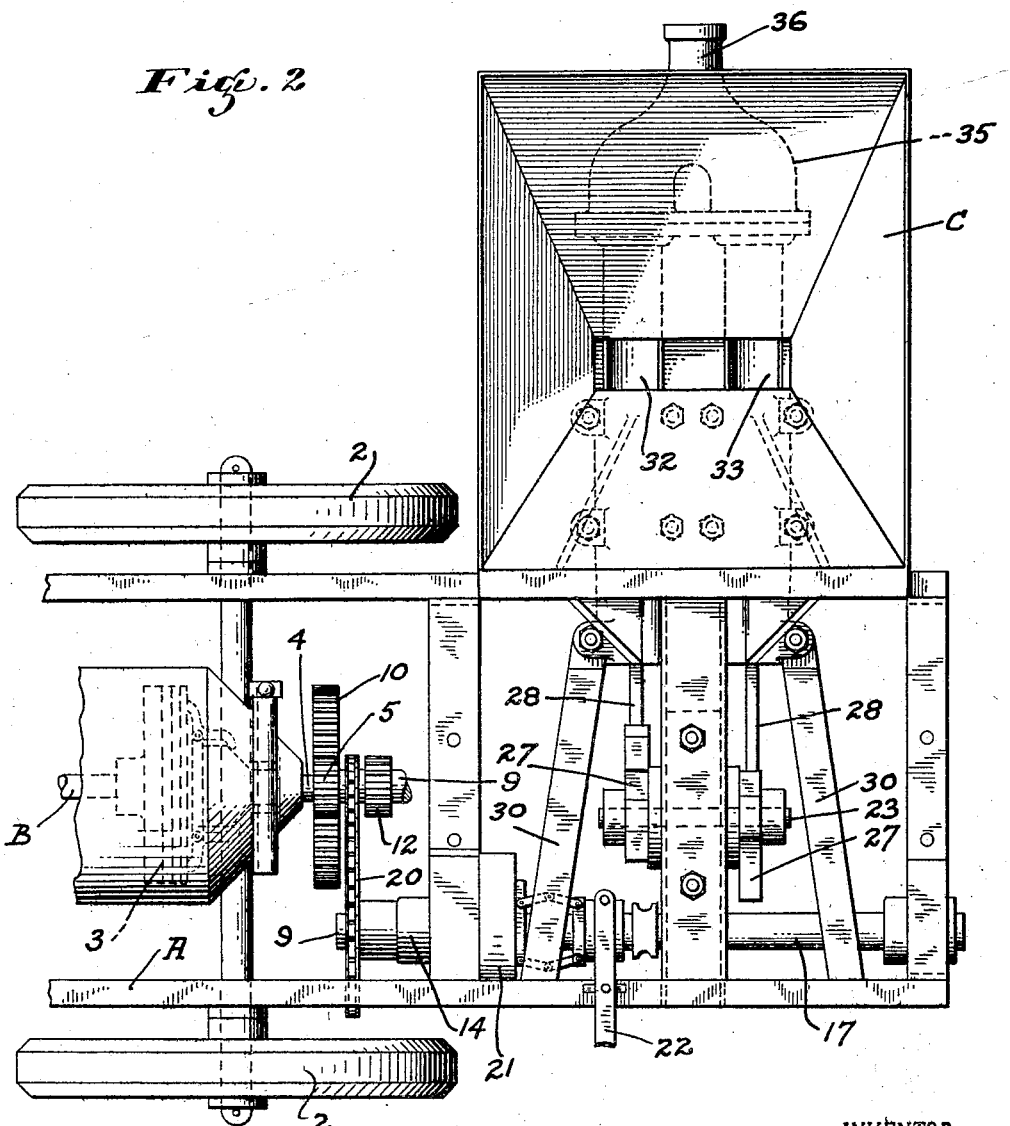
Figure 3:
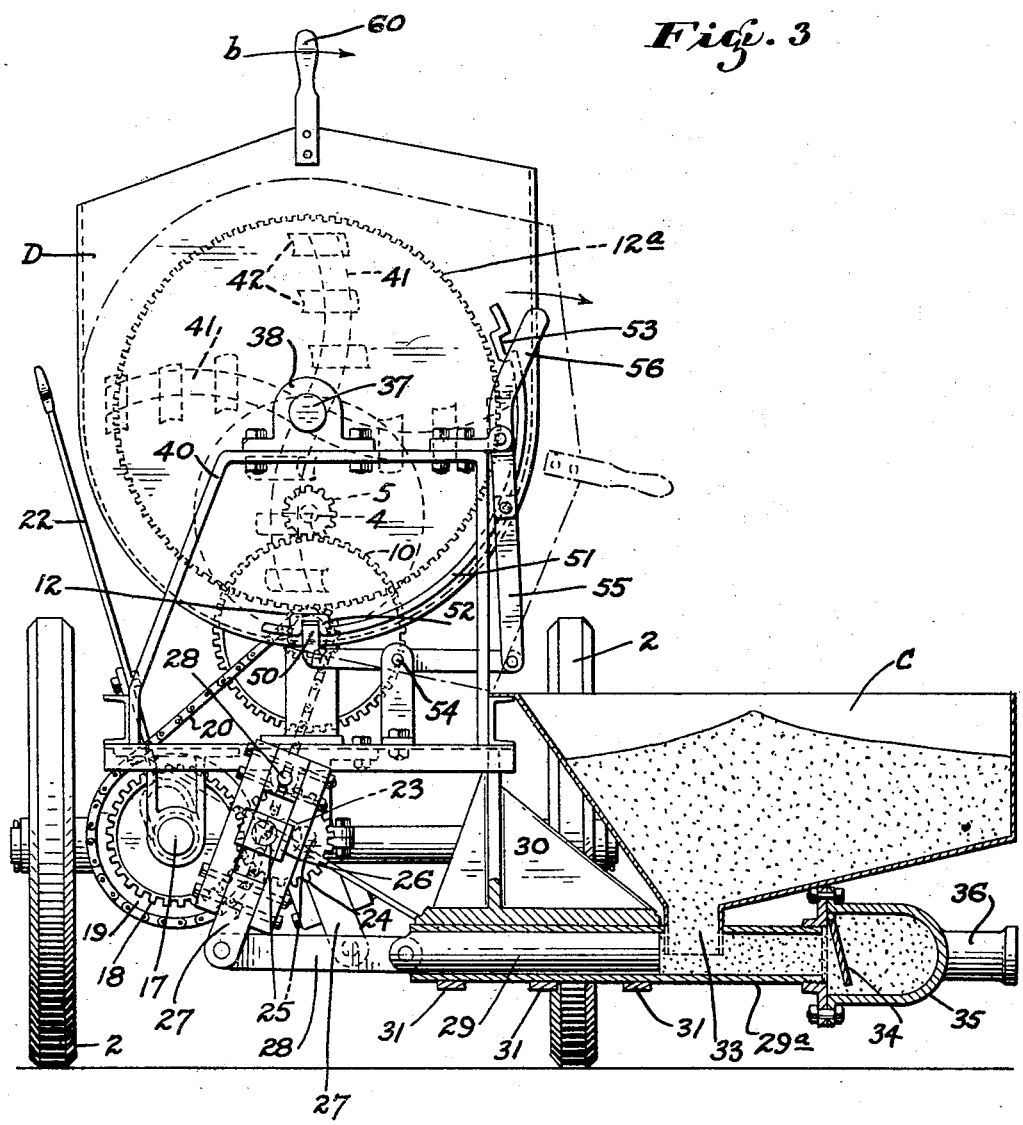

The machine is shown by way of illustration in the accompanying drawings, in which:

Fig. 1 is a side elevation of the machine partially in section, and partially broken away to show certain parts of the mechanism, Fig. 2 is a plan view of the machine, Fig. 3 is an end view, one of the cylinders of the pump and feed hopper being shown in section.

Referring to the drawings in detail, A indicates a main frame supported by wheels or the like, as indicated at 2, to permit the machine to be moved from place to place.

Mounted on the main frame, but not illustrated, is an engine from which power is transmitted to a drive shaft B. This shaft is provided with a clutch 3, and power is transmitted through the clutch to a shaft 4, upon which is mounted a driving pinion 5, the clutch being thrown into and out of operation by means of a clutch lever 6. Journalled centrally of the main frame, in bearings 7 and 8 is a shaft 9, and secured thereon is a gear 10, a sprocket gear 11 and a driving pinion 12. Journalled in bearings 14, 15 and 16, which are mounted below the main frame is a shaft 17, and secured thereon is a spur gear 18 and a sprocket gear 19. The sprocket gear 19 is driven from the sprocket 11 through means of a chain 20, and as the driving pinion 5 meshes with the gear 10, power will be transmitted from the main drive shaft B through gears 5 and 10, and sprocket chain 20 to the shaft 17. This shaft carries a clutch 21 which is operated through means of a clutch lever 22, hence shaft 17 may be thrown into or out of operation whenever desired.

Supported by journal members 23 is a shaft upon which is secured a spur gear 24, see Fig. 3. This gear meshes with the spur gear 18 and is driven thereby. The spur gear 24 is provided with two crank pins, one on each side thereof. These crank pins are opposed to each other, and one of them is clearly shown at 25. Both crank pins extend into crosshead bearings 26, which are slidably mounted on crank arms 27, these arms being pivotally supported at their upper ends with the main frame, as indicated at 28. Hence, during rotation of gear 24 an oscillating movement will be transmitted to the crank arms 27, this oscillating movement in turn being transmitted through links 28 to pistons or plungers 29 mounted in cylinders 29a.

These cylinders are supported with relation to the main frame through means of brackets 30. Caps 31 are secured on the lower ends of the brackets and these caps serve the function of clamping and securing the cylinders which are removable, as will hereinafter be described.

Mounted directly above the cylinders, and suitably supported with relation to the main frame, is a feed hopper which is generally indicated at C (see Figs. 2 and 3). The mortar to be used is dumped into this hopper and the bottom portion of the hopper is in communication with the cylinders 29 through slots or openings, such as shown at 32 and 33. The mortar is, in this manner, fed by gravity into the respective cylinders and as the plungers reciprocate back and forth the mortar admitted will be discharged in a forward direction through check valves, such as indicated at 34.

A manifold 35 connects the discharge end of the cylinders and receives the discharging mortar. The manifold terminates in a single connection, such as shown at 36 and the hose line (not here shown) is connected therewith. The machine shown in the present instance is also provided with a mixing apparatus whereby the mortar may be mixed previous to its delivery to the feed hopper C. The mixing apparatus consists of a hopper or container, generally indicated at D. The container is supported by a shaft 37 journalled in bearings 38, which in turn are supported on brackets or standards, such as indicated at 40. The shaft 37 is provided with arms 41, and these are in turn provided with blades such as shown at 42.

Shaft 37 is driven from shaft 9 through the pinion 12 and a large intermeshing gear 12a secured on shaft 37. The arms 41 and the blades 42 serve as agitators to thoroughly mix the mortar, and they are rotated through the driving pinion 5 and gear 10 which drives shaft 9. This in turn drives the pinion 12, which intermeshes with the gear 12a and as this is secured on shaft 37 continuous rotary motion will be transmitted to the agitator, said motion being, however, interrupted whenever the clutch 3 is disengaged by means of the lever 6.

The container D is normally secured in the upright position shown in Fig. 3 by means of a locking latch, such as shown at 50, see Fig. 3. That is, a segmental shaped flange 51 is secured at one end of the container and this is provided with recesses 52 and 53. Latch 50 normally engages the recess 52 and thereby secures the container in its normal upright position. Latch 50 is pivotally mounted at the point 54 and it is connected through means of a link 55 with a hand operated lever 56. When this lever is grasped and pulled in the direction of the arrow latch 50 is moved out of engagement with the notch 52. The container is thus released and if it is grasped by the handle 60 and pulled in the direction of arrow b it will be tilted to assume the dotted line position shown in Fig. 3, and it may be locked in this tilted position by latch 50 engaging the recess 53.

In this position of the container the mixed mortar is dumped or discharged into the feeding hopper C, and when the dumping operation is completed it is raised to a vertical position when new material may be added in the usual manner and mixed.

In actual operation, if power is being transmitted through the clutch 3 to the driving pinion 5, it is obvious that the mixer will be in operation, as it will be driven through the gears 5, 10, 12 and 12a. It is also obvious that shaft 17 will be rotated as it is driven through the sprocket chain 20 and the clutch 21. Its operation may, however, be discontinued by merely throwing out the clutch 21. If shaft 17 is being driven it will transmit rotary motion to the gear 24 through gear 18, as this is secured on shaft 17. If gear 24 is being rotated the opposed crank pins 25 will transmit an oscillating movement to the cranks 27, and as these are connected through links 28 with the plungers 29 in the respective pump cylinders, mortar will be continuously discharged as it is supplied to the cylinders through the feed openings 32 and 33 by gravity feed.

A hose line, as previously stated, is connected with the manifold at the point 36 and the mortar will thus be continuously discharging under pressure through the hose line and the trowel connected therewith, and the mortar may thus be rapidly applied and spread over a surface to be plastered, the particular construction of the trowel and the manner of operating the same being fully disclosed in my co-pending application already refered to, the machine shown in this application being provided for the purpose of delivering the mortar under pressure to the trowel.

The machine as a whole is simple, compact and substantial in construction. It is mounted on wheels, such as indicated at 2, and as such may readily be moved from one position to another as the plastering work proceeds, thus reducing the amount of hose line required.

Plaster or mortar is a a fairly abrasive material, and the cylinders in which the plungers 29 operate accordingly have a tendency to cut out and wear fairly rapidly. It is for this reason important to provide a structure which permits removal and renewal of the cylinders as quickly and easily as possible, and it is also important to provide a cylinder which can be cheaply replaced.

By referring to Figs. 1 and 3 it will be noted that the cylinders are nothing more or less than a pair of tubes which are slotted near one end to permit the mortar to be fed by gravity thereto, these tube-like cylinders being secured by the clamping caps 31. Hence, if it is desired to replace a cylinder it is merely necessary to retract the plungers and remove the caps 31. When this is done the new cylinder may be placed in position, the plungers inserted and the caps applied. This is quickly and readily accomplished.

The clutch indicated at 21 is also an important feature, as it is necessary to shut off the mortar supply to the trowel whenever changing from place to place, or moving the trowel from one surface to another. This is instantly accomplished in the present instance by merely pulling the clutch lever 22 to throw out the clutch, and conversely swinging it in the opposite direction to throw the clutch into engagement. The moment the clutch is thrown out the plungers 29 stop reciprocating and the mortar supply to the trowel is thus momentarily stopped.

While certain features of the present invention are more or less specifically described, I wish it understood that various changes may be resorted to within the scope of the appended claim, similarly, that the materials and finishes of the several parts employed may be such as the manufacturer may decide or varying conditions or uses may demand.

Having thus described my invention, what I claim and desire to secure by Letters Patent is:

A device of the character described comprising a pair of pump cylinders, each cylinder having an opening formed therein near one end, a feed hopper in communication with said openings and adapted to deliver mortar by gravity through the openings into the cylinders, a plunger in each cylinder, said plungers uncovering the feed openings when they reach one end of their stroke and conversely covering said feed openings so as to discharge the mortar delivered to the cylinders during reverse movement, a manifold connecting the discharge ends of the cylinders, a check valve interposed between each cylinder and the manifold, a pair of rocker arms pivotally supported at one end, a link between each rocker arm and each plunger, a rotating member, a pair of opposed crank pins on said member one on each side thereof, sliding journal members in each rocker arm and receiving the crank pins whereby an oscillating movement is transmitted to each rocker arm and a reciprocating movement to each plunger, and a drive shaft through which power is transmitted to drive the crank mechanism.

ROBERT D. HOOD.